(12) United States Patent
Sakai et al.

(10) Patent No.: US 6,975,059 B2
(45) Date of Patent: Dec. 13, 2005

(54) ELECTRIC MOTOR

(75) Inventors: Hiroshi Sakai, Gunma (JP); Masayuki Ota, Gunma (JP); Yukiyoshi Iso, Gunma (JP); Takao Ochiai, Tochigi (JP)

(73) Assignee: Mitsuba Corporation, Gunma (JP)

( * ) Notice: Subject to any disclaimer, the term of this patent is extended or adjusted under 35 U.S.C. 154(b) by 129 days.

(21) Appl. No.: 10/622,164

(22) Filed: Jul. 17, 2003

(65) Prior Publication Data

US 2004/0012296 A1 Jan. 22, 2004

(30) Foreign Application Priority Data

Jul. 18, 2002 (JP) .............................. 2002-209525

(51) Int. Cl.[7] .......................... H02K 11/02; H02K 39/38
(52) U.S. Cl. .......................... 310/239; 310/71; 310/242; 310/248; 310/249
(58) Field of Search .......................... 310/239, 71, 242, 310/248, 249, 89, 40 MM, 68 C; 29/596–598

(56) References Cited

U.S. PATENT DOCUMENTS

| | | | |
|---|---|---|---|
| 5,066,878 A | * | 11/1991 | Sekine et al. .............. 310/68 C |
| 5,886,448 A | * | 3/1999 | Yoshida ...................... 310/249 |
| 6,580,194 B2 | * | 6/2003 | Mizutani et al. ............ 310/239 |
| 6,819,019 B2 | * | 11/2004 | Tamura et al. ................ 310/71 |

FOREIGN PATENT DOCUMENTS

| | | |
|---|---|---|
| JP | 02-044854 | 2/1990 |
| JP | 03-011350 | 1/1991 |

* cited by examiner

*Primary Examiner*—Darren Schuberg
*Assistant Examiner*—Leda Pham
(74) *Attorney, Agent, or Firm*—McCormick, Paulding & Huber LLP

(57) ABSTRACT

An object of the invention is to improve a layout property of members arranged on the brush holder. Power feeding terminals are formed in a flat shape extending in an axial direction of an armature shaft, and the power feeding terminal is arranged side by side in a width direction with respect to the power feeding terminal in one end portion of a brush holder. A condenser is provided between the power feeding terminals and the armature shaft. Further, a power supply circuit for electrically connecting the power feeding terminals to a leaf spring brush is electrically connected to a motor housing via a grounding stay, and a choke coil for reducing a noise generated in the power supply circuit is arranged so as to be lapped over a screw member fixing the leaf spring brush to the brush holder in the axial direction of the armature shaft.

19 Claims, 10 Drawing Sheets

ELECTRIC MOTOR

This application is entitled to the benefit of and incorporates by reference essential subject matter disclosed in Japanese Patent Application No. 2002-209525 filed on Jul. 18, 2002.

TECHNICAL FIELD OF THE INVENTION

The present invention relates to an electric motor, and more particularly to a structure of a power feeding terminal connected to a power source.

BACKGROUND OF THE INVENTION

In conventional, an electric motor has been used as a driving source of a sunroof apparatus and a power window apparatus which are provided in a vehicle. The electric motor mentioned above has a motor housing in which two permanent magnets are fixed to an inner peripheral surface in such a manner as to face different magnetic poles to each other, and an armature which is rotatably received within the motor housing. The armature has a plurality of armature coils, and the armature coils are electrically connected to a commutator fixed to a rotation axis of the armature, respectively. The structure is made such that a pair of brushes held by a brush holder are in slidable contact with the commutator, and these brushes are electrically connected to a pair of power feeding terminals respectively fixed to the brush holder. These power feeding terminals are structured such as to be connected to female type power feeding terminals to which an electric current is supplied from a battery mounted on a vehicle, and the electric current supplied from the battery is supplied to the brush via the power feeding terminals. Further, the electric current supplied to the brush is rectified via the commutator so as to be supplied to the armature coil, whereby a rotation force is generated in the armature and the armature shaft is rotated.

Since the electric motor is attached to an inner side of a roof or an inner side of a door in the vehicle, it is required that a thickness thereof is made compact and thin. Accordingly, for example, in an electric motor shown in Japanese Patent Application Laid-Open No. 3-11350 or 244854, a motor housing is structured as a so-called oval (oblong) type yoke, and a thickness of the motor housing is made smaller than the thickness of a normal cylindrical motor housing. In this case, the brush holder fixed to the motor housing is formed as an oval type having a pair of end portions, and a pair of side surface portions connecting these end portions, and the structure is made such that the respective power feeding terminals are arranged in the end portions of the brush holder.

However, in the electric motor as mentioned above, since the respective power feeding terminals are formed in a flat shape, and are arranged in such a manner as to face the flat portions thereof to each other, it is impossible to secure a sufficient space between the power feeding terminal in the end portion and the rotation axis. Therefore, for example, it is hard to arrange a member such as a condenser or the like which is connected to a portion between the respective power feeding terminals and corresponds to a noise absorbing element for absorbing an electric noise generated by the brush portion, on the compact brush holder.

An object of the present invention is to improve a layout property of members arranged on the brush holder.

SUMMARY OF THE INVENTION

In accordance with the present invention, there is provided an electric motor having an armature which is provided with a commutator fixed to a rotation axis and an armature coil electrically connected to the commutator and is rotatably provided within a motor housing, and having a brush which is in slidable contact with the commutator, comprising: a brush holder fixed to the motor housing and holding a pair of brushes; a first power feeding terminal provided with a first connecting portion electrically connected to one of the brushes and with a first leading end portion electrically connected to a power source, formed in a flat shape extending in an axial direction of the rotation axis, and provided in the brush holder; and a second power feeding terminal provided with a second connecting portion electrically connected to another of the brushes and with a second leading end portion electrically connected to the power source, formed in a flat shape extending in the axial direction of the rotation axis, and provided in the brush holder so as to be arranged side by side in a width direction with respect to the first power feeding terminal, wherein an electric current is supplied to a pair of brushes via the first and second power feeding terminals.

In accordance with the present invention, there is provided an electric motor, wherein the brush holder is formed in a shape having a pair of end portions each having a circular arc outer peripheral surface and a pair of side surface portions in which outer peripheral surfaces respectively connecting a pair of end portions are flat, and the first and second power feeding terminals are provided in the one end portion.

In accordance with the present invention, there is provided an electric motor, wherein a noise absorbing element having a first lead wire electrically connected to a base end portion of the first power feeding terminal and a second lead wire electrically connected to a base end portion of the second power feeding terminal is provided between the first and second power feeding terminals and the rotation axis so as to make the first and second lead wires in parallel to the rotation axis.

In accordance with the present invention, there is provided an electric motor, wherein any one of the first and second lead wires and the base end portions of the first and second power feeding terminals are bent vertical to the axial direction of the rotation axis.

In accordance with the present invention, there is provided an electric motor, wherein the brush holder is provided with a wall portion for inhibiting the noise absorbing element from moving to a side of the rotation axis.

In accordance with the present invention, since the first power feeding terminal electrically connected to one of the brushes and the second power feeding terminal electrically connected to another of the brushes are respectively formed in the flat shape extending in the axial directions of the rotation axes, and are fixed to the brush holder so as to be arranged side by side in the width direction, it is possible to secure a space on the brush holder between the respective power feeding terminals and the rotation axes and to improve a layout property of members arranged on the brush holder.

Further, in accordance with the present invention, since the space can be secured on the brush holder between the respective power feeding terminals and the rotation axes, it is possible to effectively place the noise holder absorbing element connected to the portion between the respective power feeding terminals.

Still further, in accordance with the present invention, since the structure is made such that the lead wire of the noise absorbing element and the base end portion of the power feeding terminal are connected by bending any one of them vertical to the axial direction of the rotation axis, it is possible to facilitate the connection between the noise absorbing element and the power feeding terminal, that is, an assembling work of the electric motor.

Further, in accordance with the present invention, since the wall portion is provided between the noise absorbing element of the brush holder and the rotation axis, it is possible to inhibit the noise absorbing element from moving to the side of the rotation axis, so that it is possible to prevent the noise absorbing element from being in contact with the rotation axis, and it is possible to improve a reliability in the operation of the electric motor.

In accordance with the present invention, there is provided an electric motor having an armature which is provided with a commutator fixed to a rotation axis and an armature coil electrically connected to the commutator and is rotatably provided within a motor housing, and having a brush which is held by a brush holder fixed to the motor housing and is in slidable contact with the commutator, comprising: a power feeding terminal provided in the brush holder and electrically connected to a power source; a conductive member provided in the brush holder and constructing a power supply circuit provided between the power feeding terminal and the brush; and a grounding member having a conductive member side connecting portion electrically connected to the conductive member and a motor housing side connecting portion electrically connected to the motor housing, and electrically connecting the conductive member to the motor housing.

In accordance with the present invention, there is provided an electric motor, wherein the conductive member side connecting portion is electrically connected to the conductive member via a noise preventing element.

In accordance with the present invention, there is provided an electric motor, wherein the motor housing side connecting portion is provided so as to be freely bent with respect to a main body portion arranged on the brush holder.

In accordance with the present invention, there is provided an electric motor, wherein the motor housing side connecting portion is fixed to a cover member closing an opening end of the motor housing by a fastening means together with the brush holder.

In accordance with the present invention, there is provided an electric motor, wherein a conductive plate electrically connected to the motor housing is provided between the motor housing and the cover member, and a connection piece formed in the conductive plate is fixed to the cover member by the fastening means together with the motor housing side connecting portion.

In accordance with the present invention, there is provided an electric motor, wherein the conductive member side connecting portion is provided on the brush holder so as to be freely deformed in a direction moving apart from the brush holder.

In accordance with the present invention, since the conductive member is electrically connected to the motor housing via the grounding member, it is possible to reduce the noise generated in the power supply circuit of the electric motor by making the noise to be absorbed by the motor housing.

Further, in accordance with the present invention, since the motor housing side connection portion is provided so as to be freely bent with respect to the main body portion, a fixing force generated at a time of fixing the motor housing side connection portion to the cover member is absorbed by the bending deformation of the motor housing side connection portion. Accordingly, it is possible to reduce a stress generated in the connection portion between the conductive member side connection portion and the conductive member or the noise preventing element at a time of fixing the motor housing side connection portion to the cover member, and it is possible to secure a reliability in the connection portion between the conductive member side connection portion and the conductive member or the noise preventing element.

Still further, in accordance with the present invention, since the structure is made such that the conductive plate electrically connected to the motor housing is provided between the motor housing and the cover member, and the connection piece provided in the conductive plate is fixed to the cover member by the fastening member together with the motor housing side connection portion, it is possible to facilitate the connection between the grounding member and the motor housing so as to improve an assembling property of the electric motor.

Further, in accordance with the present invention, since the grounding member is always in contact with the connection piece in an energized state by an elastic force generated by the bending deformation, it is possible to improve a reliability in the connection between the grounding member and the motor housing.

Still further, in accordance with the present invention, since the conductive member side connection portion is provided so as to be freely bent in the direction moving apart from the brush holder, it is possible to maintain the reliability in the connection between the conductive member side connection portion and the noise preventing element, even in the case that the grounding member is fixed to the cover member after soldering the noise preventing element to the conductive member side connection portion. Further, since it is possible to fix the motor housing side connection portion to the cover member after soldering the noise preventing element to the grounding member, it is possible to facilitate the assembling work of the electric motor.

In accordance with the present invention, there is provided an electric motor having an armature which is provided with a commutator fixed to a rotation axis and with an armature coil electrically connected to the commutator, and is rotatably provided within a motor housing, comprising: a brush holder fixed to the motor housing; at least a pair of brushes each fixed to the brush holder by screw members arranged in parallel to the rotation axis and being in slidable contact with the commutator; and a noise preventing element provided in a power supply circuit electrically connecting each of the brushes to a power source, and arranged so as to be lapped over any one of the screw members in an axial direction of the rotation axis.

In accordance with the present invention, there is provided an electric motor, wherein the brush holder is formed in a shape in which a pair of end portions each having a circular arc outer peripheral surface and an outer peripheral surface each connecting a pair of the end portions have a pair of flat side surface portions, and the noise preventing element is provided in any one of the end portions.

In accordance with the present invention, there is provided an electric motor, wherein a pair of the brushes are provided so as to be opposed to each other in a direction which is shifted at a predetermined angle with respect to a longitudinal direction of the brush holder.

In accordance with the present invention, there is provided an electric motor, wherein one lead wire of the noise preventing element is electrically connected to the power supply circuit in one side of the end portions, and another lead wire is electrically connected to the power supply circuit in another side of the end portions.

In accordance with the present invention, there is provided an electric motor, wherein the another lead wire reaches the another end portion along a guide wall portion provided in the side surface portion.

In accordance with the present invention, there is provided an electric motor, wherein a receiving portion for receiving the noise preventing element is provided in the brush holder.

In accordance with the present invention, there is provided an electric motor, wherein the noise preventing element is a choke coil arranged in such a manner that an axial direction thereof is made parallel to the rotation axis.

In accordance with the present invention, since the noise preventing element provided in the power supply circuit is arranged so as to be lapped over the screw member arranged in parallel to the rotation axis and fixing the brush to the brush holder in the axial direction of the rotation axis, it is possible to reduce a space for placing the noise preventing element and it is possible to downsize the electric motor.

Further, in the present invention, since the brush holder is formed in the oval type having a pair of end portions and the side surface portion, the noise preventing element is provided in one of the end portions, one lead wire of the noise preventing element is electrically connected to the power supply circuit in one of the end portions, and another lead wire is connected to the power supply circuit in another of the end portions, it is not necessary that the wiring member for introducing the power supply circuit from one of the end portions to another of the end portions is provided, and it is possible to reduce the manufacturing cost by reducing the number of the parts in the electric motor.

Further, in accordance with the present invention, since the noise preventing element is received in the choke coil receiving portion provided in the brush holder, and the lead wire of the noise preventing element reaching from one of the end portions to another of the end portions is arranged along the guide wall portion provided in the side surface portion, it is possible to protect the noise preventing element so as to improve a reliability in the electric motor.

DESCRIPTION OF THE PREFERRED EMBODIMENTS

A description will be in detail given below of an embodiment in accordance with the present invention with reference to the accompanying drawings.

Figure 1:
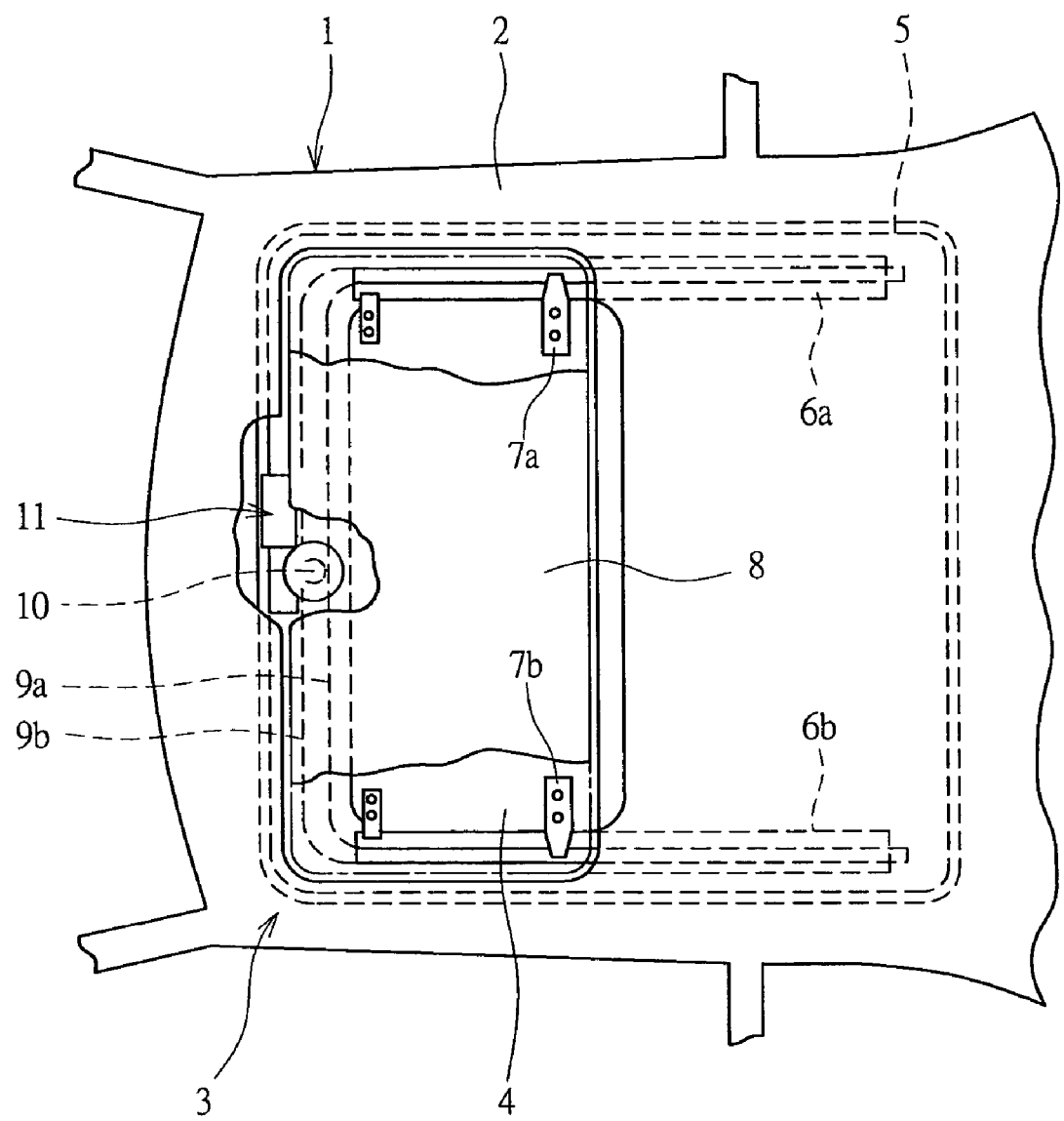
FIG. 1 is a plan view showing an outline of a vehicle to which a sunroof apparatus having a sunroof motor corresponding to one embodiment in accordance with the present invention is attached.

As shown in FIG. 1, a sunroof apparatus 3 is provided in a roof 2 of a vehicle 1. The sunroof apparatus 3 has a mounting frame 5 which is fixed to a position in the periphery of an opening portion 4 formed in the roof 2, and two guide rails 6a and 6b extending in a back and forth direction of the vehicle are fixed to the mounting frame 5. Shoes 7a and 7b are respectively attached to the guide rails 6a and 6b so as to freely move along the guide rails 6a and 6b, and a roof panel 8 is fixed to the shoes 7a and 7b. Then, the roof panel 8 is structured such as to be guided by the guide rails 6a and 6b integrally with the shoes 7a and 7b so as to be freely opened and closed in the back and forth direction of the vehicle.

Respective one ends of driving cables 9a and 9b with gears are connected to the shoes 7a and 7b. These driving cables 9a and 9b are respectively arranged in a front side of the vehicle, and are engaged with a driving gear 10 rotatably attached to the front side of the vehicle in the mounting frame 5. Further, the driving cables 9a and 9b are operated in an axial direction in a state of being reversed to each other due to a rotation of the driving gear 10, and the roof panel 8 is structured such as to be pushed and pulled by the driving cables 9a and 9b so as to be opened and closed. Accordingly, an operating direction of each of the driving cables 9a and 9b is determined by the direction of rotation of the driving gear 10, whereby a moving direction of the roof panel 8 is determined.

Figure 2:
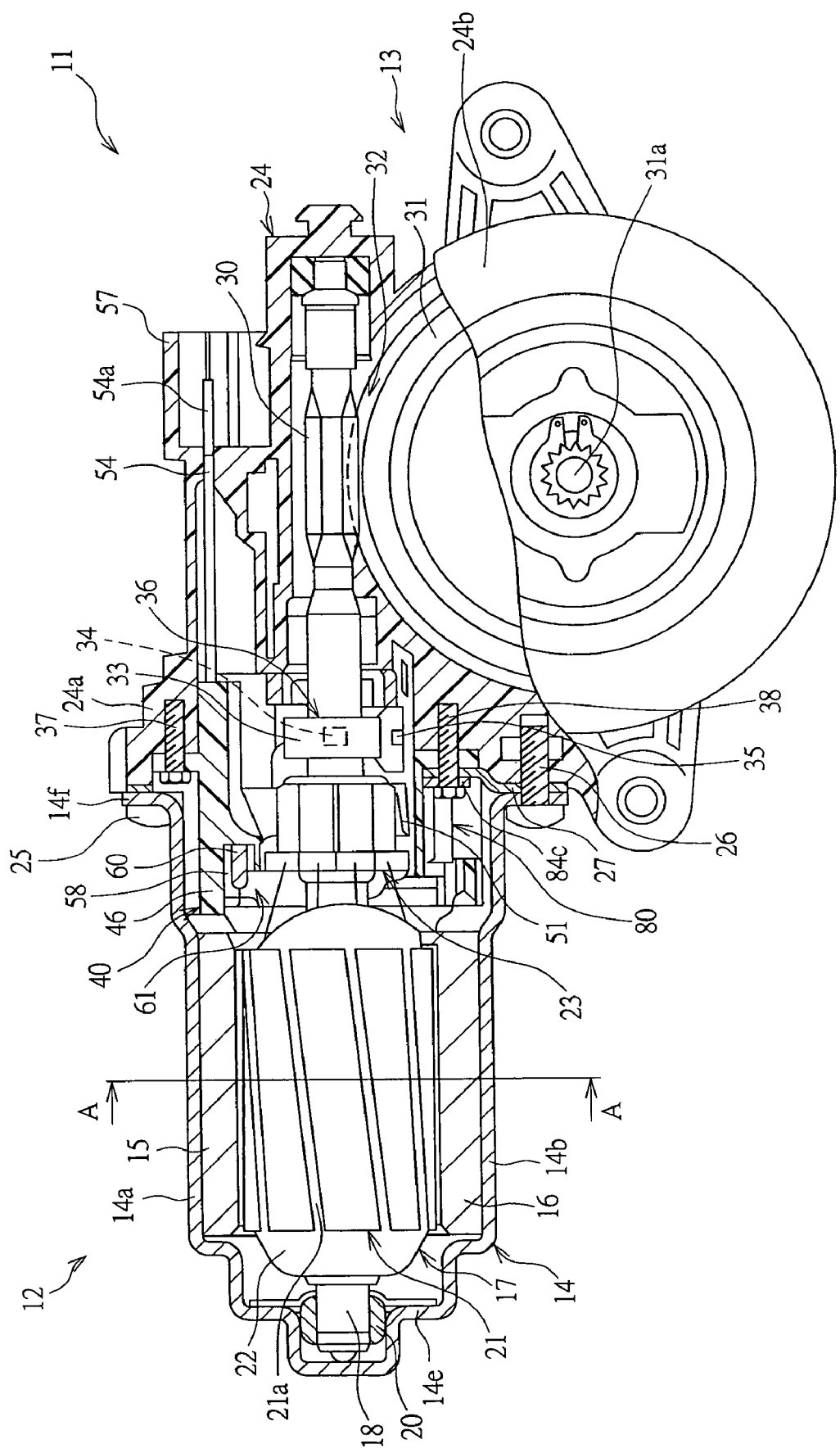
FIG. 2 is a cross sectional view showing details of the sunroof motor shown in FIG. 1.
Figure 3:
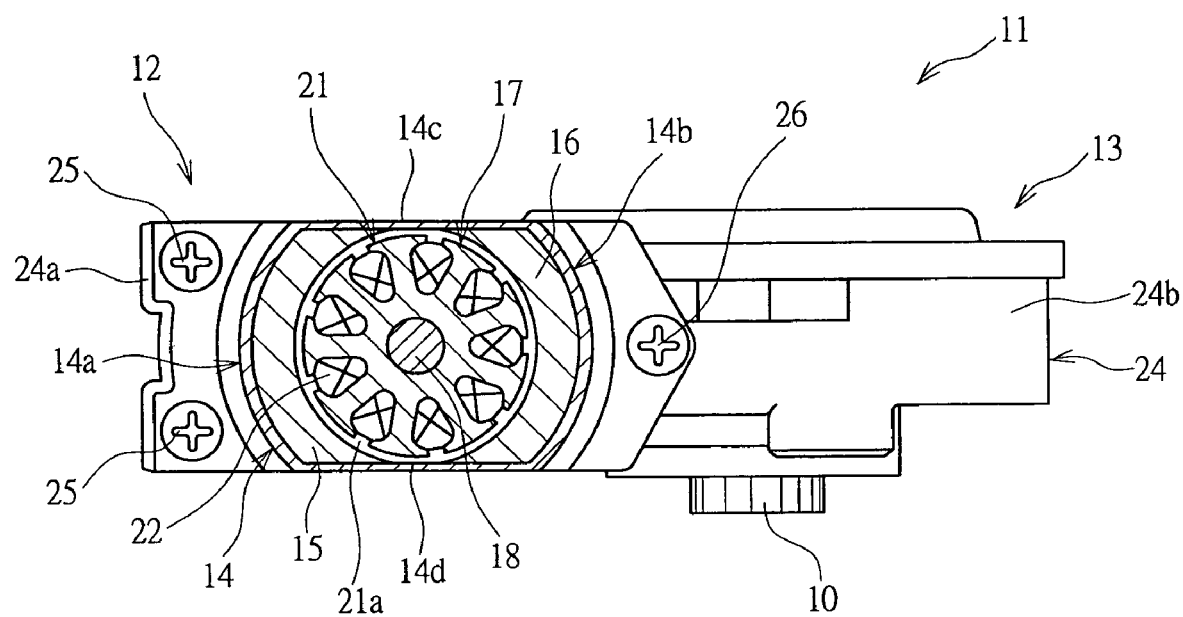
FIG. 3 is a cross sectional view along a line A-A in FIG. 2.
Figure 4:
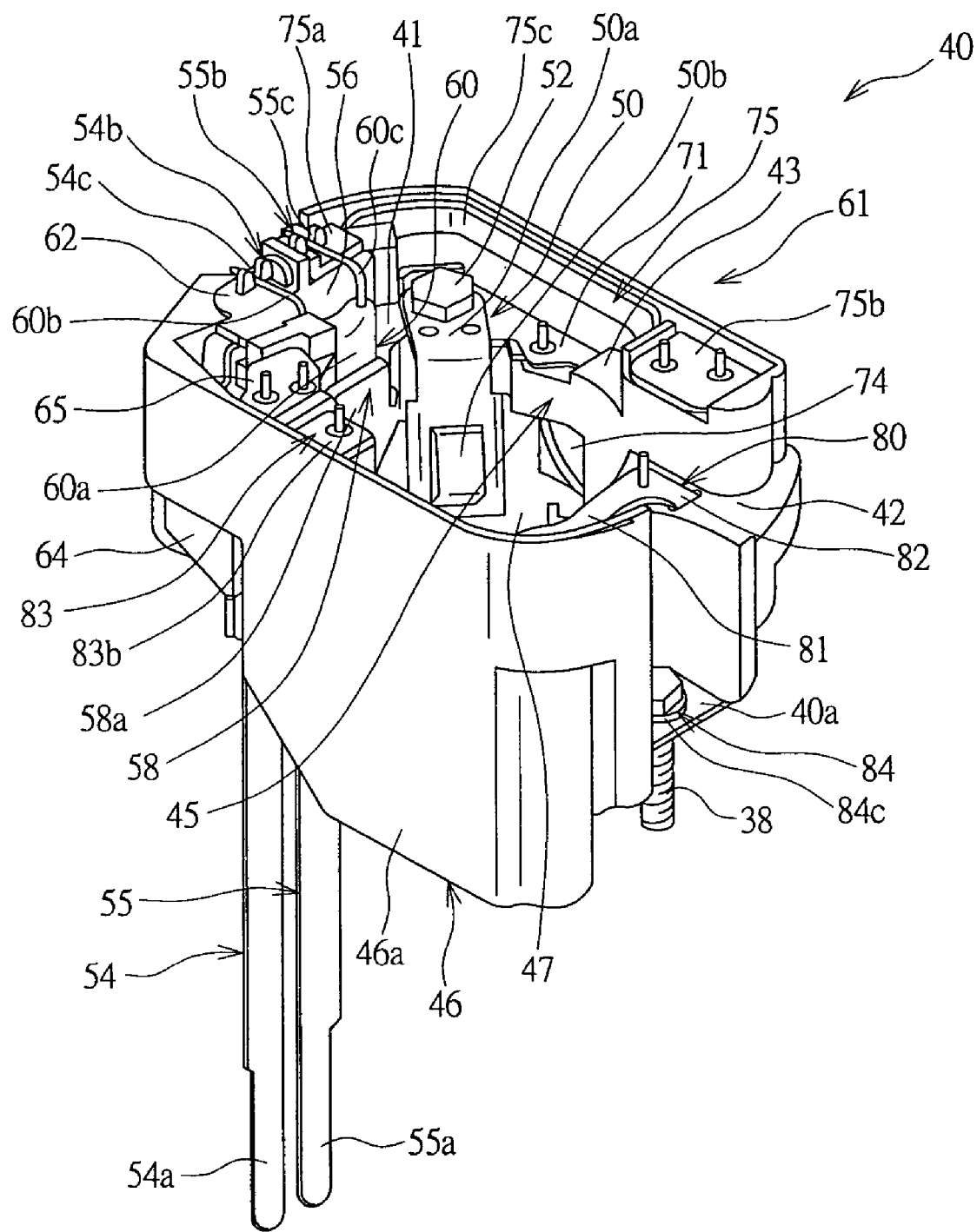
FIG. 4 is a perspective view showing details of a brush holder shown in FIG. 2.
Figure 5:
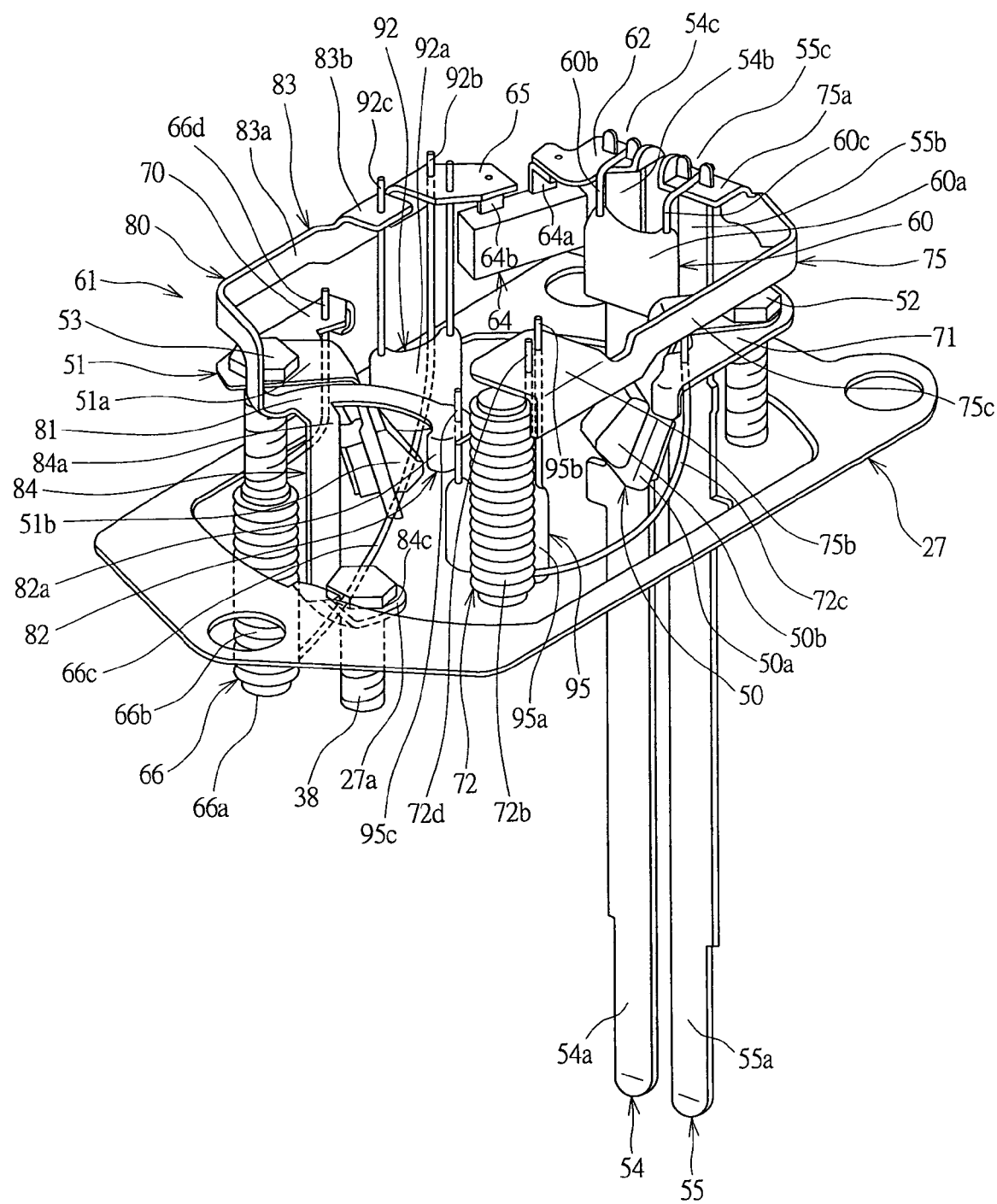
FIG. 5 is a perspective view of the brush holder shown in FIG. 4.
Figure 6A:
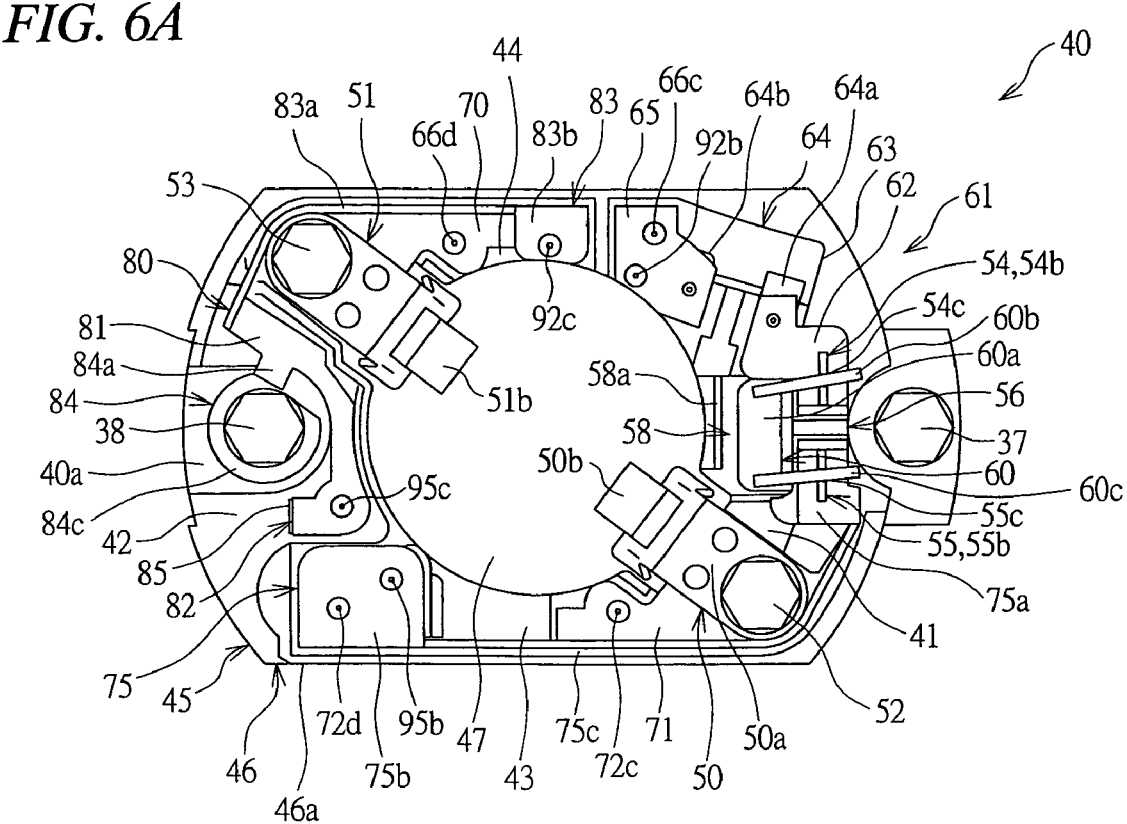
FIG. 6A is a front elevational view of the brush holder shown in FIG. 4.
Figure 6B:
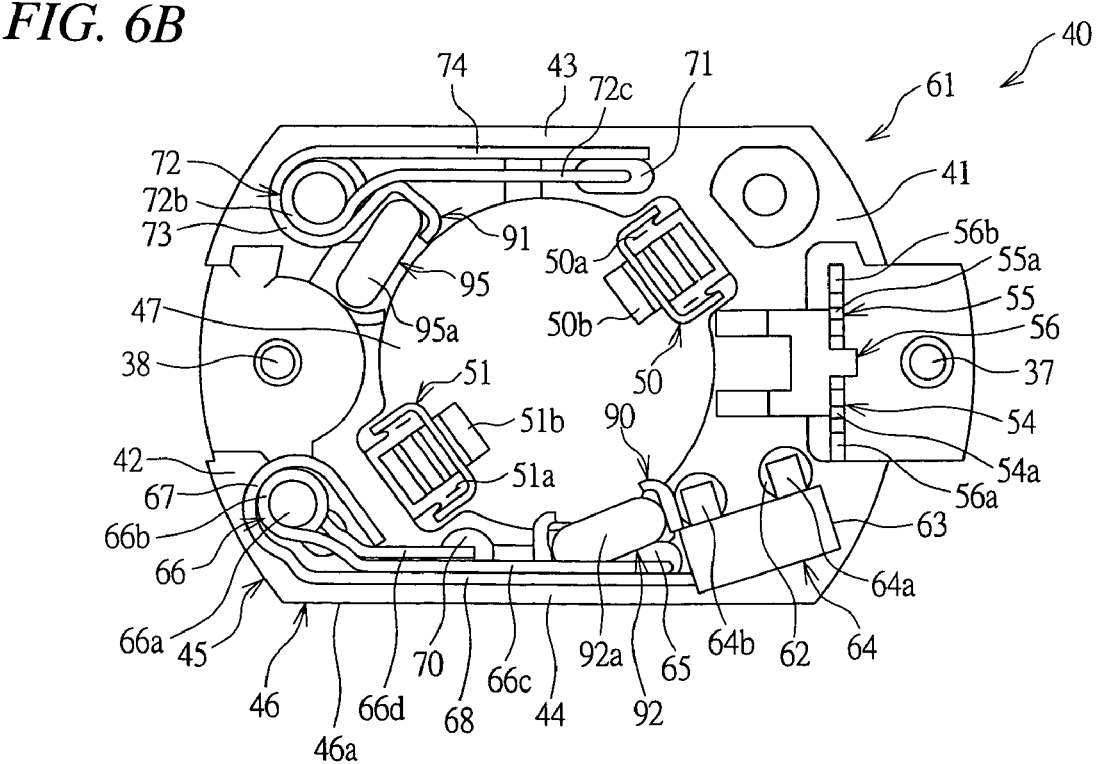
FIG. 6B is a bottom elevational view of the brush holder shown in FIG. 4.
Figure 7:
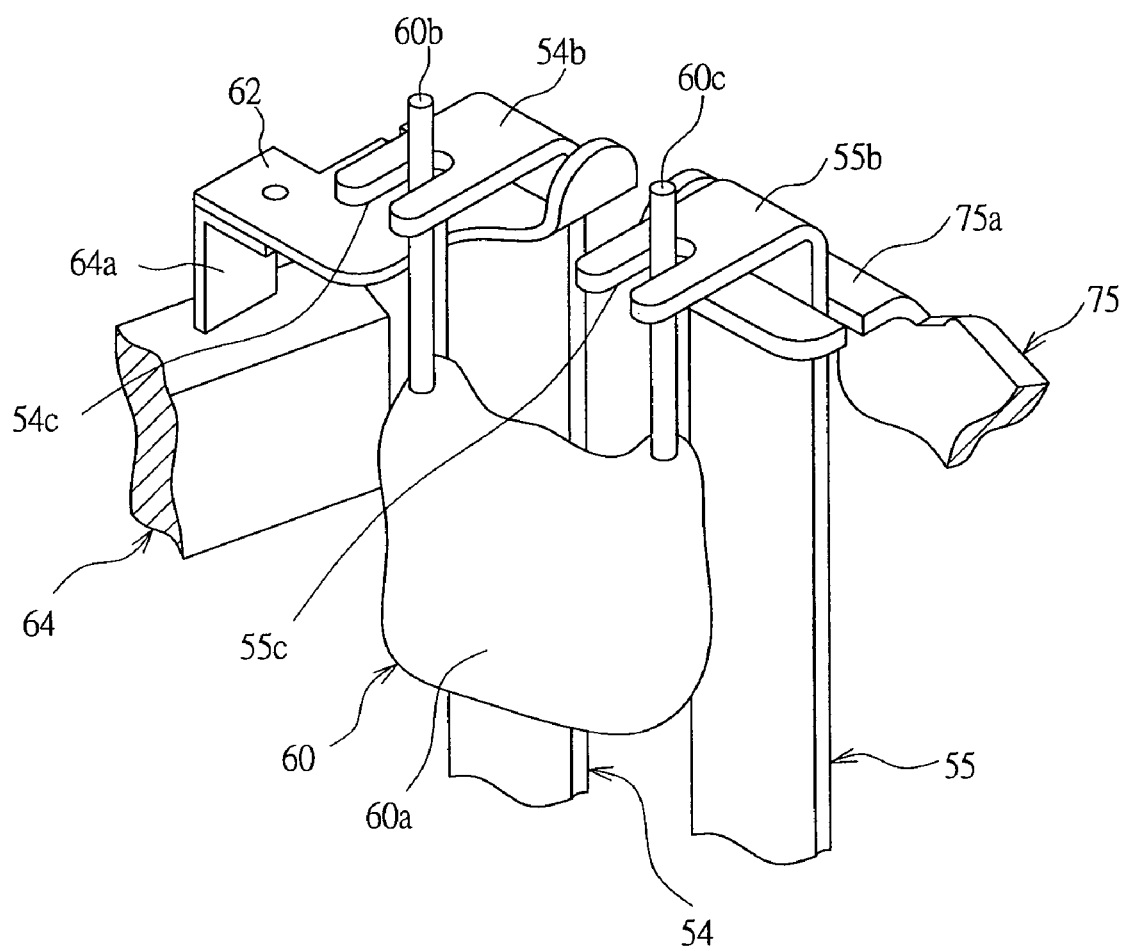
FIG. 7 is a cross sectional view showing a modified embodiment of a connection portion between a power feeding terminal and a condenser.
Figure 8A:
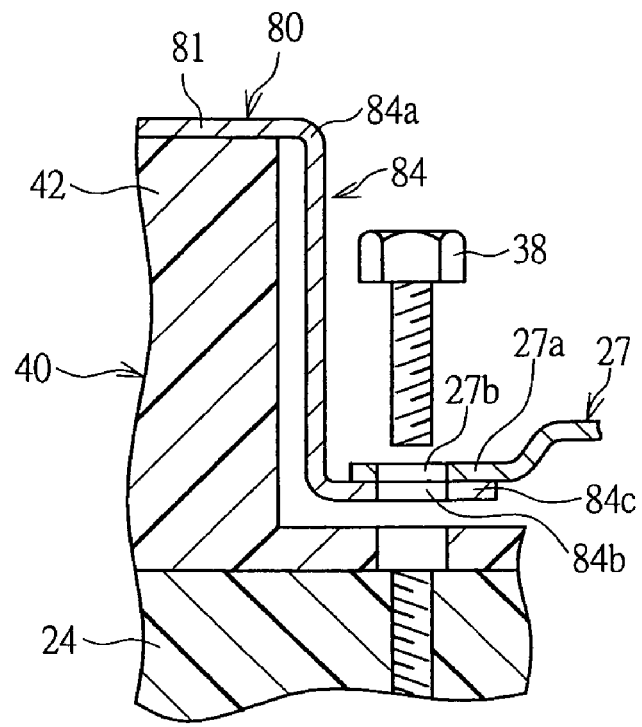
FIG. 8A is a cross sectional view showing a shape of a motor housing side connection portion prior to being fixed to a gear housing.
Figure 8B:
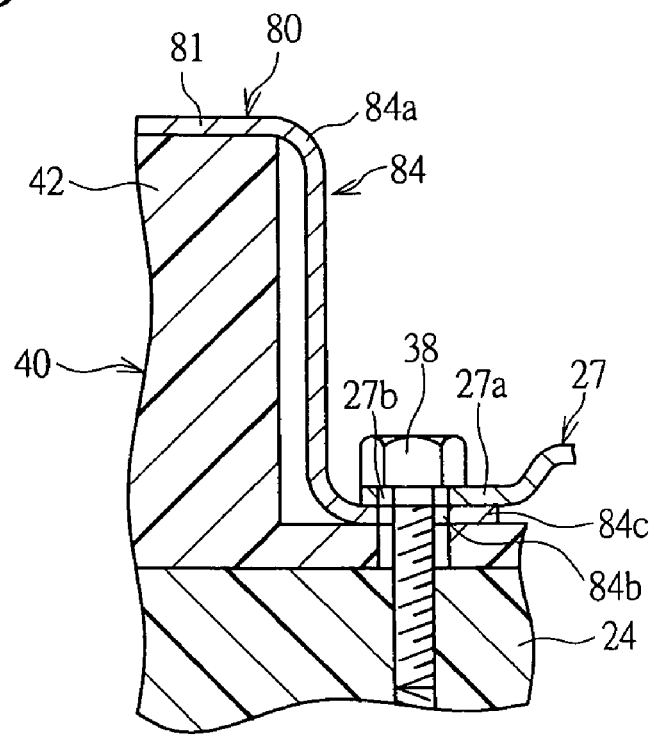
FIG. 8B is a cross sectional view showing a shape of the motor housing side connection portion after being fixed to the gear housing.
Figure 9:
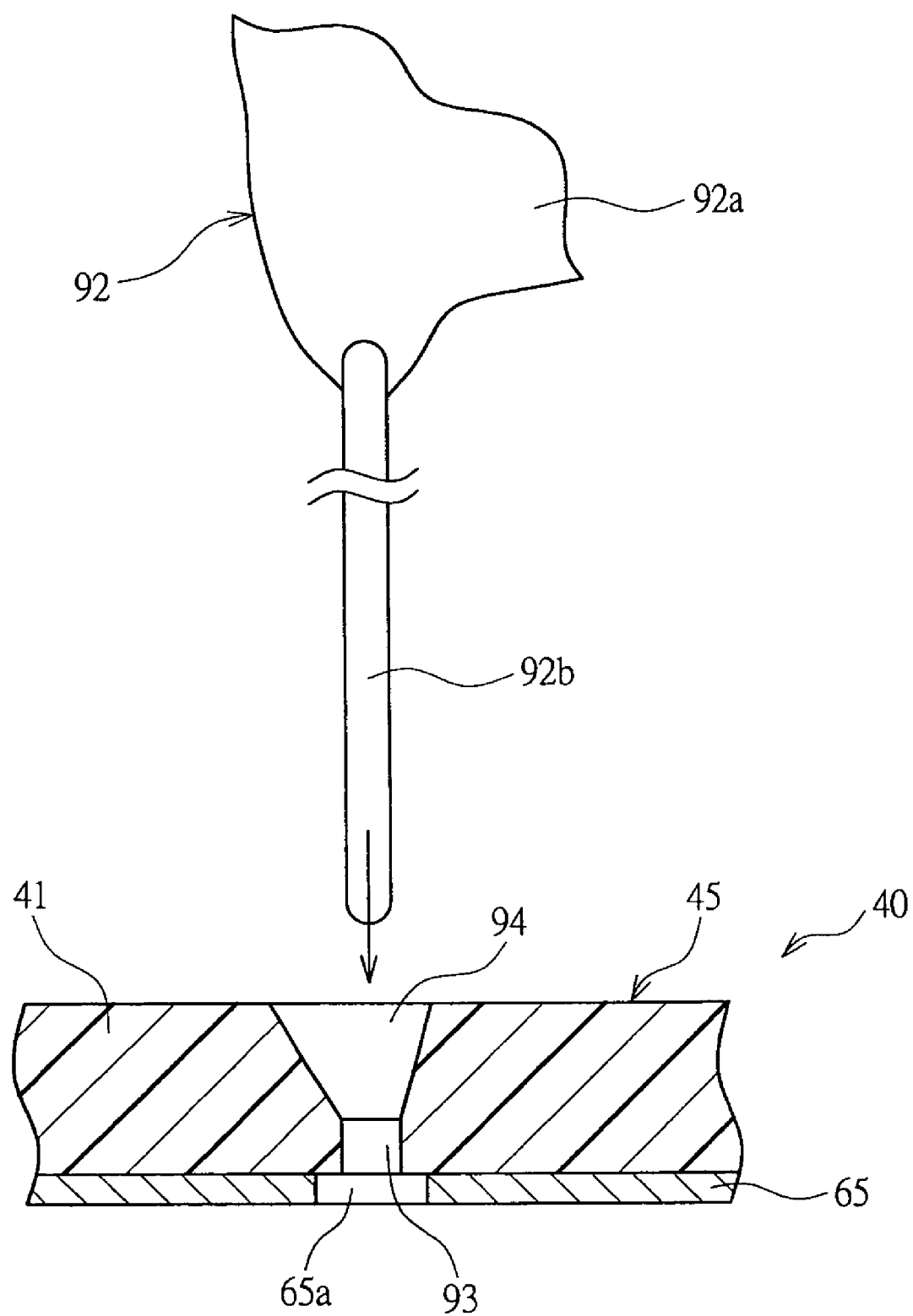
FIG. 9 is a cross sectional view showing details of a connection portion of a condenser to a conductive plate.
Figure 10:
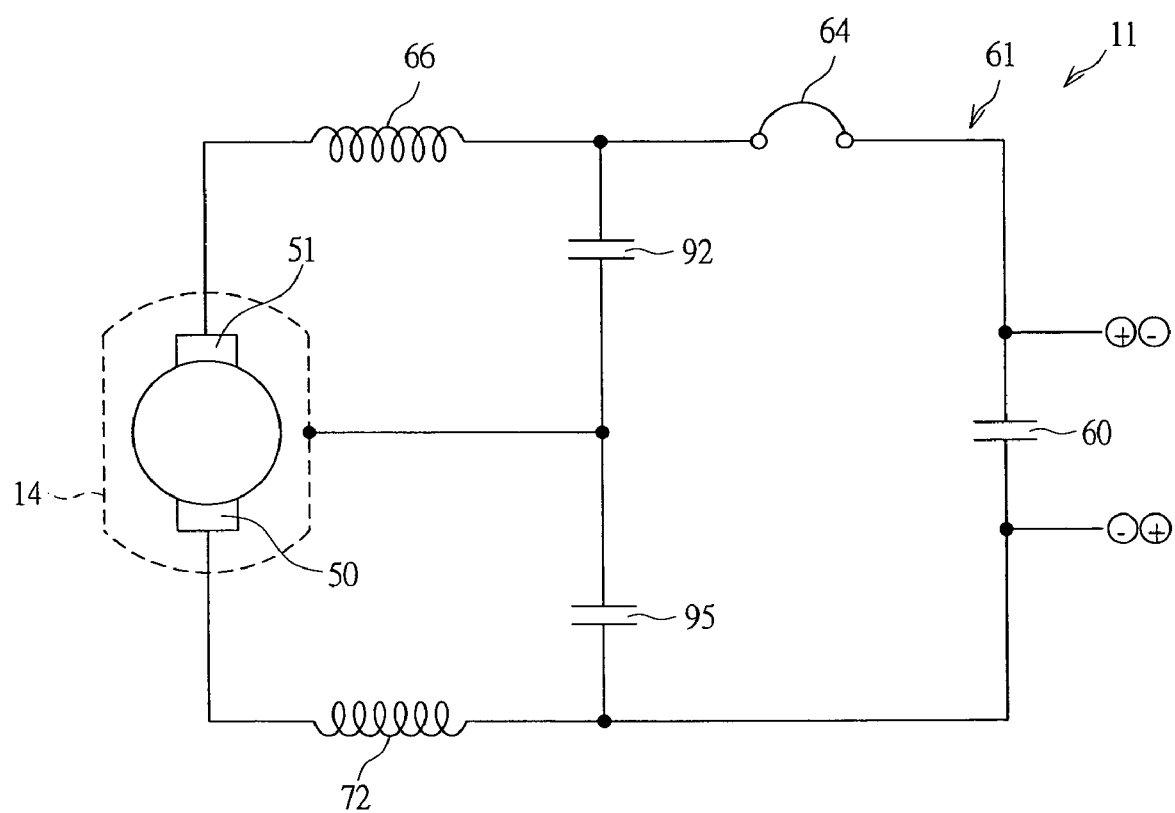
FIG. 10 is a circuit diagram showing an outline of a power supply circuit of the sunroof motor shown in FIG. 2.

FIG. 2 is a cross sectional view showing details of the sunroof motor shown in FIG. 1, and FIG. 3 is a cross sectional view along a line A—A in FIG. 2. Further, FIG. 4 is a perspective view showing details of a brush holder shown in FIG. 2, and FIG. 5 is a perspective view of the brush holder shown in FIG. 4. Further, FIGS. 6A and 6B are a front elevational view and a bottom elevational view of the brush holder shown in FIG. 4, and FIG. 7 is a cross sectional view showing a modified embodiment of a connection portion between a power feeding terminals and a condenser. Further, FIG. 8A is a cross sectional view showing a shape of a motor housing side connection portion prior to being fixed to a gear housing, and FIG. 8B is a cross sectional view showing a shape of the motor housing side connection portion after being fixed to the gear housing. Further, FIG. 9 is a cross sectional view showing details of a connection portion of a condenser to a conductive plate, and FIG. 10 is a circuit diagram showing details of a power circuit of the sunroof shown in FIG. 2.

In order to drive the rotation of the driving gear 10, a sunroof motor 11 is provided in the sunroof apparatus 3. As shown in FIG. 2, the sunroof motor 11 has a motor main body 12 and a reduction gear 13, and is structured such as to reduce an output of the motor main body 12 by the reduction gear 13 so as to transmit to the driving gear 10.

The motor main body 12 is, as shown in FIG. 3, provided with a motor housing 14 which has a pair of curved walls 14a and 14b and a pair of flat walls 14c and 14d and is formed by a conductive member in a so-called oval (oblong)

type. One end of the motor housing 14 is closed by a bottom wall portion 14e, and another end is formed as an open end 14f. In the motor housing 14, an interval between the flat walls 14c and 14d, that is, a size in a thickness direction of the motor housing 14 is set narrower than an interval between the curved walls 14a and 14b, that is, a size in a width direction of the motor housing 14, so that the motor housing 14 is formed as a thin type in comparison with the cylindrical motor housing. Further, the motor housing 14 is set in a state of not being grounded on the vehicle 1, that is, a state of not being electrically in contact with the vehicle 1 (a floating state).

Two permanent magnets 15 and 16 in which different magnetic poles thereof are opposed to each other are fixed to inner peripheral surfaces of the curved walls 14a and 14b, thereby forming a magnetic field within the motor housing 14. Further, an armature 17 is received in an inner portion of the motor housing 14, and an armature shaft 18 corresponding to a rotation axis is supported by a bearing 20 provided in a bottom wall portion 14e, whereby the armature 17 is set rotatable within the motor housing 14.

An armature core 21 having a plurality of slots 21a are provided in the armature 17, and a copper wire is wound around each of the slots 21a, whereby a plurality of armature coils 22 corresponding to armature windings are formed. Further, a commutator 23 is fixed to the armature shaft 18, and each of the armature coils 22 is electrically connected to the commutator 23.

On the other hand, the reduction gear 13 is provided with a gear housing 24 constituted by a mounting portion 24a to the motor housing 14 and a gear receiving portion 24b and formed by a resin material, and is fixed to the motor housing 14 by screw members 25 and 26 in a state of confronting the mounting portion 24a to the open end 14f of the motor housing 14. That is, the open end 14f of the motor housing 14 is closed by the gear housing 24 corresponding to a cover member. Further, a conductive plate 27 is clamped between the motor housing 14 and the gear housing 24, and the conductive plate 27 is brought into contact with the open end 14f of the motor housing 14, and is set in a state of being electrically connected to the motor housing 14.

A leading end portion of the armature shaft 18 is received in the gear receiving portion 24b, and a worm 30 is formed on an outer peripheral surface within the gear receiving portion 24b of the armature shaft 18. Further, a worm wheel 31 is rotatably received within the gear receiving portion 24b, and the worm 30 is engaged with the worm wheel 31. That is, a worm gear mechanism 32 constituted by the worm 30 and the worm wheel 31 is formed within the gear receiving portion 24b. The driving gear 10 is fixed to an axis of the worm wheel 31 via an output axis 31a, and the driving gear 10 is structured such as to rotate together with the worm wheel 31. Accordingly, when the armature shaft 18 is rotated, the structure is made such that the rotation is reduced via the worm gear mechanism 32 so as to be transmitted to the driving gear 10.

Further, a multipole magnetized magnet 33 fixed to the armature shaft 18, and a rotation speed sensor 36 having two hole ICs 34 and 35 opposing to the multipole magnetized magnet 33 with a phase angle of 90 degrees with each other are provided within the mounting portion 24a. Further, the rotation speed sensor 36 is structured such as to output a pulse signal in correspondence to the rotation of the armature shaft 18 from the respective hole ICs 34 and 35 on the basis of the rotation of the armature shaft 18.

A brush holder 40 is fixed to the mounting portion 24a of the gear housing 24 by two screw members 37 and 38, that is, the brush holder 40 is fixed to the motor housing 14 via the gear housing 24. The brush holder 40 is formed in a so-called oval (oblong) shape having a pair of end portions 41 and 42 each having a circular arc outer peripheral surface, and a pair of side surface portions 43 and 44 connecting a pair of end portions 41 and 42 and each formed in a flat shape on an outer peripheral surface thereof, and the structure is made such that a supporting plate 45 extending in a diametrical direction of the armature shaft 18 and a case 46 having an outer peripheral wall 46a extending vertical to the supporting plate 45 are integrally formed by a resin material. Further, in the brush holder 40, a thickness of the brush holder 40, that is, an interval between the outer peripheral surfaces of the respective side surface portions 43 and 44 is set wider than a width of the brush holder 40, that is, an interval between the outer peripheral surfaces of the respective end portions 41 and 42, in correspondence to the shape of the motor housing 14. Further, a through hole 47 through which the armature shaft 18 passes is provided in an axis of the supporting plate 45, and the commutator 23 is positioned within the through hole 47.

Leaf spring brushes 50 and 51 are fixed respectively to the end portions 41 and 42 of the supporting plate 45. The leaf spring brush 50 is structured such that a brush portion 50b is fixed to a leaf spring member 50a formed by bending a conductive flat plate in an L shape, and in the same manner, the leaf spring brush 51 is structured such that a brush portion 51b is fixed to a leaf spring member 51a formed by bending a conductive flat plate in an L shape. Further, the leaf spring brush 50 is held, that is, fixed to a position biased to a side of the side surface portion 43 in the end portion 41 of the supporting plate 45 by a screw member 52 which is arranged in parallel to the armature shaft 18 in a base end portion thereof, and the leaf spring brush 51 is held, that is, fixed to a position biased to a side of the side surface portion 44 in the end portion 42 of the supporting plate 45 by a screw member 53 which is arranged in parallel to the armature shaft 18 in a base end portion thereof. Therefore, these leaf spring brushes 50 and 51 are structured such that the brush portions 50b and 51b are opposed to each other in a longitudinal direction of the brush holder 40, that is, a direction displaced at a predetermined angle with respect to the width direction. Further, the respective brush portions 50b and 51b are structured such as to be in slidable contact with an outer peripheral surface of the commutator 23 in an inner portion of the through hole 47, and at this time, the respective leaf spring members 50a and 51a are elastically deformed so as to elastically energize the respective brush portions 50b and 51b toward the commutator 23. As mentioned above, in the present embodiment, a pair of leaf spring brushes 50 and 51 are provided as the brush, however, the structure is not limited to this, and any structure can be employed as far as a plurality of brushes are provided. Further, the structure is made such that a pair of leaf spring brushes 50 and 51 are opposed to each other in the longitudinal direction of the brush holder 40, that is, the direction displaced at the predetermined angle with respect to the width direction, however, the structure is not limited to this, and a pair of leaf spring brushes 50 and 51 may be arranged in the other places such as the structure that they are arranged so as to be opposed to each other in the width direction of the brush holder 40, and the like.

A power feeding terminal 54 corresponding to a first power feeding terminal and a power feeding terminal 55 corresponding to a second power feeding terminal are provided in the end portion 41 of the supporting plate 45. The power feeding terminal 54 is formed in a narrow flat shape by a conductive material, a leading end portion of the power feeding terminal 54 is provided with a power source side connection portion 54a corresponding to a first leading end portion formed in such a manner that a width is narrower than a middle portion, and a base end portion 54b corresponding to a first connection portion is provided with a slit 54c extending in a longitudinal direction. In the same manner, the power feeding terminal 55 is formed in a narrow flat shape by a conductive material, a leading end portion of the power feeding terminal 55 is provided with a power source side connection portion 55a corresponding to a second leading end portion formed in such a manner that a width is narrower than a middle portion, and a base end portion 55b corresponding to a second connection portion is provided with a slit 55c extending in a longitudinal direction.

A power feeding terminal fixing portion 56 is provided in the end portion 41 of the supporting plate 45 so as to be positioned at an appropriately intermediate position of the brush holder 40 in the end portion in a thickness direction, and be deflected to an outer peripheral surface side of the end portion 41. Two power feeding terminal fixing holes 56a and 56b each of which is in parallel to an axial direction of the armature shaft 18 are provided in the power feeding terminal fixing portion 56, each of the power feeding terminal fixing holes 56a and 56b is formed in a rectangular shape in which a transversal cross section thereof is long in a thickness direction of the brush holder 40, and the power feeding terminal fixing holes 56a and 56b are arranged side by side in a width direction. Further, the power feeding terminal 54 is fitted and fixed to the power feeding terminal fixing portion 56 by inserting the base end portion 54b from a side of the gear housing 24 to the power feeding terminal fixing hole 56a, and the power feeding terminal 55 is fitted and fixed to the power feeding terminal fixing portion 56 by inserting the base end portion 55b from a side of the gear housing 24 to the power feeding terminal fixing hole 56b, in the same manner. Further, the base end portions 54b and 55b of the respective power feeding terminals 54 and 55 fixed to the power feeding terminal fixing portion 56 are structured such as to protrude from the power feeding terminal fixing portion 56 to a side of the motor housing 14, that is, a side of the motor main body 12. Accordingly, the respective power feeding terminals 54 and 55 extend from the base end portions 54b and 55b in parallel to the axial direction of the armature shaft 18, and the power feeding terminal 55 is arranged side by side in the width direction with respect to the power feeding terminal 54.

Accordingly, in this sunroof motor 11, since it is possible to secure a space between the power feeding terminals 54 and 55 of the brush holder 40 and the armature shaft 18, by respectively forming the power feeding terminals 54 and 55 in an oblong flat shape and fixing them to the brush holder 40 side by side in such a manner as to direct a longitudinal direction to the axial direction of the armature shaft 18, it is possible to improve a layout property of the members arranged on the brush holder 40.

The power source side connection portions 54a and 55a of the respective power feeding terminals 54 and 55 are structured such as to be received within a coupler 57 integrally formed with the gear housing 24. The structure is made such that a female connector (not shown) connected to a battery corresponding to a power source (not shown) mounted on the vehicle 1 is connected to the coupler 57, and the respective power feeding terminals 54 and 55 are electrically connected to the battery in the power source side connection portions 54a and 55a via the female connector, so that an electric current is supplied from the battery.

A condenser case 58 is provided in the supporting plate 45 so as to be positioned between the power feeding terminal fixing portion 56 and the through hole 47, and a condenser 60 corresponding to a noise absorbing element is received within the condenser case 58. The condenser 60 has a main body portion 60a and first and second lead wires 60b and 60c respectively protruding from the main body portion 60a, and the main body portion 60a is received within the condenser case 58 so as to be arranged between the power feeding terminals 54 and 55 and the armature shaft 18. Further, the condenser case 58 has a wall portion 58a which is positioned in a side of the through hole 47 and is opposed to the condenser 60, and a movement (a tilt) of the condenser 60 to a side of the armature shaft 18 is limited to the wall portion 58a.

Each of the lead wires 60b and 60c protrudes to a side of the motor housing 14 with respect to the main body portion 60a, and is approximately parallel to the armature shaft 18. Further, the first lead wire 60b is bent in an approximately middle portion thereof to a side of the base end portion 54b vertically to the axial direction of the armature shaft 18, and is inserted to the slit 54c in a side of a leading end portion thereof so as to be electrically connected to the base end portion 54b of the power feeding terminal 54. In the same manner, the second lead wire 60c is bent in an approximately middle portion thereof to a side of the base end portion 55b vertically to the axial direction of the armature shaft 18, and is inserted to the slit 55c in a side of a leading end portion thereof so as to be electrically connected to the base end portion 55b of the power feeding terminal 55. In the present embodiment, the lead wires 60b and 60c of the condenser 60 are respectively bent to the sides of the base end portions 54b and 55b, however, the structure is not limited to this. As shown in FIG. 7, the structure may be made such that the base end portions 54b and 55b of the power feeding terminals 54 and 55 are respectively bent to the sides of the lead wires 60b and 60c vertically to the axial direction of the armature shaft 18. In this case, in FIG. 7, the same reference numerals are attached to the corresponding members to those mentioned above.

Accordingly, in this sunroof motor 11, since the condenser 60 is provided between the power feeding terminals 54 and 55 and the armature shaft 18 so that the lead wires 60b and 60c are in parallel to the armature shaft, it is possible to effectively arrange the condenser 60 on the brush holder 40.

Further, since the structure is made such that the lead wires 60b and 60c of the condenser 60 are connected to the base end portions 54b and 55b of the power feeding terminals 54 and 55 by bending any one of the lead wires 60b and 60c of the condenser 60 and the base end portions 54b and 55b of the power feeding terminals 54 and 55 vertically to the axial direction of the armature shaft 18, it is possible to improve a connection property between the condenser 60 and the power feeding terminals 54 and 55, that is, an assembling property of the sunroof motor.

Further, since the wall portion 58a is provided between the condenser 60 of the brush holder and the armature shaft 18, it is possible to inhibit the condenser 60 from moving (tilting) to the side of the armature shaft 18, so that it is possible to securely prevent the condenser 60 and the armature shaft 18 or the commutator 23 from being in contact with each other, and it is possible to improve an operation reliability of the sunroof motor 11.

The power feeding terminals 54 and 55 are electrically connected to the respective leaf spring brushes 50 and 51 via the power supply circuit 61, and a direct current supplied from the battery to the power feeding terminals 54 and 55 is transmitted to the respective lead spring brushes 50 and 51 via the power supply circuit 61. The power supply circuit 61 is formed as a so-called filter circuit, and is structured such as to reduce a noise, that is, an electric noise generated at a time of rectifying by means of the brush portions 50*b* and 51*b* and the commutator 23. A description will be given below of a structure of the power supply circuit.

A conductive connection plate 62 electrically connected to the base end portion 54*b* of the power feeding terminal 54 is provided in the power feeding terminal fixing portion 56, and this connection plate 62 is electrically connected to one connection terminal 64*a* of a circuit breaker 64 received in a rectangular hole 63 provided in the supporting plate 45 in accordance with a soldering. Another connection terminal 64*b* of the circuit breaker 64 is electrically connected to a conductive branch plate 65 arranged on the supporting plate 45 in accordance with a soldering, and a choke coil 66 is electrically connected to the branch plate.

The choke coil 66 corresponding to a noise preventing element has a winding wire portion 66*b* wound around an insulative core member 66*a*, and a pair of leg portions 66*c* and 66*d* corresponding to lead wires respectively protruding from both ends of the winding wire portion 66*b*, and the winding wire portion 66*b* is received in a choke coil receiving portion 67 formed in a side of the gear housing 24 of the supporting plate 45, that is, a side of the reduction gear 13 so as to make an axial direction thereof parallel to the armature shaft 18. This choke coil receiving portion 67 is provided at a position deflected to a side of the side surface portion 44 of the end portion 42, in the same manner as that of the screw member 53. Accordingly, the choke coil 66 is arranged so as to be lapped over the screw member 53 in the axial direction of the armature shaft 18, that is, on an extension of the screw member 53 in the side of the gear housing 24. At this time, an axis of the choke coil 66 is slightly displaced from an axis of the screw member 53, however, is not arranged side by side with respect to the screw member 53. That is, the choke coil 66 is arranged in an overlapping manner so as to make the end portion of the screw member 53 in one side in the axial direction, that is, the side of the gear housing 24 oppose to the end portion of the winding wire portion 66*b* in the side of the motor housing 14.

One leg portion 66*c* of the choke coil 66 reaches another end portion 41 from the winding wire portion 66*b* along a guide wall portion 68 provided in the side wall portion 44, and a leading end portion protrudes to the side of the motor housing 14 from the side of the gear housing 24 of the supporting plate 45 via a through hole (not shown) provided in the end portion 42 so as to be electrically connected to the branch plate 65 in accordance with a soldering. That is, the leg portion 66*c* extends from one end portion 42 of the supporting plate 45 toward another end portion 41, and forms a crossover between the winding wire portion 65*b* and the branch plate 65 so as to electrically connect the winding wire portion 66*b* to the branch plate 65. Further, another leg portion 66*d* of the choke coil 66 protrudes to the side of the motor housing 14 from the side of the gear housing 24 of the supporting plate 45 via a through hole (not shown) provided in the end portion 42, and is electrically connected to a connection plate 70 provided between the end portion 42 of the supporting plate 45 and the side surface portion 44 in the side of the end portion 42 in accordance with a soldering.

Accordingly, in this sunroof motor 11, since the choke coil 66 provided in the power supply circuit 61 is arranged so as to be lapped over the screw member 53 arranged in parallel to the armature shaft 18 and fixing the leaf spring brush 51 to the brush holder 40 in the axial direction of the armature shaft 18, it is possible to reduce the space for placing the choke coil 66 and it is possible to make the sunroof motor 11 compact.

Further, since the supporting plate 45 constructing the brush holder 40 is formed in the oval (oblong) shape having a pair of end portions 41 and 42 and the side surface portions 43 and 44, one end leg portion 66*c* of the choke coil 66 is electrically connected to the power supply circuit 61 in one end portion 41, and another leg portion 66*d* is connected to the power supply circuit 61 in another end portion 42, it is not necessary to provide with the wiring member for introducing the power supply circuit 61 from one end portion 41 to another end portion 42, and it is possible to reduce the number of the parts of the sunroof motor 11 so as to reduce the manufacturing cost.

Further, since the choke coil 66 is received in the choke coil receiving portion 67 provided in the supporting plate 45, and the leg portion 66*c* of the choke coil 66 reaching from one end portion 42 to another end portion 41 is arranged along the guide wall portion 68 provided in the side surface portion 44 so as to be formed as the crossover, it is possible to electrically wire between the end portions 41 and 42 without arranging the member in the side surface portions 43 and 44 of the oval brush holder 40, and it is possible to protect the choke coil 66 from the other members or the like so as to improve a reliability of the sunroof motor 11.

The connection plate 70 is fixed to the end portion 42 of the supporting plate 45 together with the leaf spring member 51*a* by the screw member 53, and is set in a state of being electrically connected to the leaf spring member 51*a*. Accordingly, the power feeding terminal 54 is electrically connected to the leaf spring brush 51 via the connection plate 62, the circuit breaker 64, the branch plate 65, the choke coil 66 and the connection plate 70 constituting the power supply circuit 61.

On the other hand, in the same manner as that of the connection plate 70, a connection plate 71 is fixed to the end portion 41 of the supporting plate 45 together with the leaf spring member 50*a* by the screw member 52, and one leg portion 72*c* of a choke coil 72 having a winding wire portion 72*b* and a pair of leg portions 72*c* and 72*d* is electrically connected to the connection plate 70 in the same manner as that of the choke coil 66 in accordance with a soldering. The choke coil 72 is received in a choke coil receiving portion 73 formed at a position deflected to a side of the side surface portion 43 in the side of the gear housing 24 of the end portion 42 of the supporting plate 45 so as to make an axial direction of the windbag wire portion 72*b* parallel to the armature shaft 18. Further, one leg portion 72*c* of the choke coil 72 reaches another end portion 41 from one end pardon 42 provided with the winding wire portion 72*b* along a guide wall portion 74 provided in the side surface portion 43, a leading end portion thereof protrudes to the side of the motor housing 14 from the side of the gear housing 24 of the supporting plate 45 via a through hole (not shown) provided in the end portion 41 so as to be electrically connected to the connection plate 71 in accordance with a soldering. That is, the leg portion 72*c* extends from one end portion 42 of the supporting plate 45 toward another end portion 41, and forms a crossover between the winding wire portion 72*b* and the connection plate 71 so as to electrically connect the winding wire portion 72*b* to the connection plate 71. Further, another leg portion 72*d* of the choke coil 72 protrudes to the side of the motor housing 14 from the side of the gear housing 24 of the supporting plate 45 via a through hole (not shown) provided in the end portion 42.

A connection stay 75 arranged between the end portions 41 and 42 and the side surface portion 43 is provided on the supporting plate 45. The connection stay 75 is formed by bending a conductive flat plate, and has a power feeding side connection portion 75a electrically connected to the power feeding terminal 55 in the power feeding terminal fixing portion 56, a branch side connection portion 75b arranged in the end portion 42 of the supporting plate 45, and a stay main body portion 75c connecting the power feeding side connection portion 75a to the branch side connection portion 75b.

The power feeding side connection portion 75a and the branch side connection portion 75b are respectively provided in parallel to the supporting plate 45, and on the contrary, the stay main body portion 75c is bent at an angle of 90 degrees with respect to the power feeding side connection portion 75a and the branch side connection portion 75b so as to be along an inner surface of the outer peripheral wall 46a of the case 46. Further, the stay main body portion 75c extends from the end portion 41 along the outer peripheral wall 46a, through a portion near the side of the motor housing 14 of the leaf spring brush 50, to the end portion 42 via the side surface portion 43.

Accordingly, in this sunroof motor 11, since the flat stay main body portion 75c passing through the side of the motor housing 14 in the leaf spring brush 50 is bent at 90 degrees with respect to the supporting plate 45 so as to be along the inner surface of the outer peripheral wall 46a in the case 46, the stay main body portion 75c is hard to be exposed to the noise discharged from the slidable contact portion between the commutator 23 and the brush portion 50b, so that it is possible to reduce the noise generated in the sunroof motor 11. Further, it is possible to reduce the space for placing the stay main body portion 75c. Further, since it is possible to secure a working space at a time of connecting the connection plate 71 to the leg portion 72c of the choke coil 72 in accordance with the soldering, it is possible to improve an assembling property of the sunroof motor 11.

Further, it is possible to improve a freedom of arranging each of the members such as the power feeding terminal 55, the leaf spring brush 50, the choke coil 72 and the like, by connecting each of the members constituting the power supply circuit 61 provided in both end portions 41 and 42 in a divisional manner to each other via the connection stay 75.

The branch side connection portion 75b is arranged so as to be lapped over the choke coil receiving portion 73 in the end portion 42 of the supporting plate 45 in the axial direction of the armature shaft 18, and the leg portion 72d of the choke coil 72 protrudes from the winding wire portion 72b in the axial direction so as to be electrically connected to the branch side connection portion 75b in accordance with a soldering. On the other hand, the power feeding side connection portion 75a is electrically connected to the base end portion 55b of the power feeding terminal 55. Accordingly, the leaf spring brush 50 is electrically connected to the power feeding terminal 55 via the connection plate 71, the choke coil 72 and the connection stay 75 constituting the power supply circuit 61.

The supporting plate 45 is provided with a grounding stay 80 corresponding to a grounding member for electrically connecting the power supply circuit 61 to the motor housing 14. This grounding stay 80 has a stay main body 81 corresponding to a main body portion, two condenser connecting portions 82 and 83 and a motor housing side connection portion 84 corresponding to a conductive member side connection portion, and these portions are integrally formed by a conductive flat plate. The stay main body portion 81 is arranged on the end portion 42 so as to be in parallel to the supporting plate 45, and the condenser side connection portion 82 is provided on the end portion 42 in the side of the side surface portion 43 of the stay main body portion 81. This condenser side connection portion 82 is structured such that a hook portion 82a is slidably inserted to an engagement hole 85 provided in the end portion 42, and freely bend in a direction of moving apart from the end portion 42.

The condenser side connection portion 83 is provided in the side of the side surface portion 44 of the stay main body portion 81, and has an extension portion 83a and a connection plate portion 83b. The extension portion 83a is provided so as to be bent at 90 degrees with respect to the stay main body portion 81, and extends to an approximately middle position in the width direction of the brush holder 40 in the side surface portion 44 from the end portion 42 along the inner surface of the outer peripheral wall 46a of the case 46, through the side of the motor housing 14 of the leaf spring brush 51. Further, the connection plate portion 83b is bent at 90 degrees with respect to the extension portion 83a at the approximately middle position in the width direction of the brush holder 40 so as to be arranged on the side surface portion 44 in parallel to the supporting plate 45.

The motor housing side connection portion 84 is provided so as to be bent at 90 degrees via a bent portion 84a with respect to the stay main body portion 81 from an approximately center portion of the stay main body portion 81, and is made freely bendable with respect to the stay main body portion 81. That is, the motor housing side connection portion 84 can bend so that the bent portion 84a changes a bending angle. Further, the motor housing side connection portion 84 is structured such that when a tensile force is applied to the stay main body portion 81 in a longitudinal direction, the bent portion 84a extends in a direction in which a radius of bending is enlarged and can absorb the tensile force. Further, the motor housing side connection portion 84 is fixed to the gear housing 24 together with the brush holder 40 in a fixing portion 84c having a fixing hole 84b formed in a leading end portion thereof by the screw member 38 corresponding to the fastening means. At this time, as shown in FIG. 8A, the fixing portion 84c before being fixed to the brush holder 40 by the screw member 38 becomes in a state of floating at a predetermined distance from the grounding stay fixing surface 40a formed in the brush holder 40, and as shown in FIG. 8b, is fixed by the screw member 38, whereby the bent portion 84a is deformed and the fixing portion 84c is in contact with the grounding stay fixing surface 40a. Accordingly, the fixing portion 84c is in a state in which an elastic force is applied to the screw member 38 in an axial direction due to the bending deformation of the bent portion 84a, whereby it is possible to absorb a fastening stress of the screw member 38 and it is possible to obtain an effect of preventing the screw member 38 itself from being slacked. Therefore, it is not necessary to provide with any slack preventing member such as a washer or the like in the screw member 38, and it is possible to reduce a manufacturing cost and a man hour by reducing the number of the parts in the sunroof motor 11.

A connection piece 27a formed in the conductive plate 27 metnioned above is clampled between the motor housing side connection portion 84 and the brush holder 40, and thid connection piece 27a is fixed to the gear housing 24 together with the motor housing side connection portion 84 by the screw member 38 in a fixing hole 27b provided in an axis of the connection piece 27a. That is, the motor housing side connection portion 84 is fastened together with the connection piece 27a by the screw member 38, thereby being electrically connected to the conductive plate 27.

Accordingly, in this sunroof motor 11, since the grounding stay 80 and the motor housing 14 are electrically connected by arranging the conductive plate 27 electrically connected to the motor housing 14 between the motor housing 14 and the gear housing 24, fixing the connection piece 27a provided in the conductive plate 27 to the gear case 24 together with the motor housing side connection portion 84 by the screw member 38, and clamping the conductive plate 27 at a time of fastening the motor housing 14 and the gear case 24 by the screw members 25 and 26, it is possible to easily connect the grounding stay 80 to the motor housing 14, and it is possible to improve an assembling property of the sunroof motor 11.

Further, since the fixing portion 84c is always in contact with the connection piece 27a in an energizing state by an elastic force in the in the bent portion 84a, it is possible to improve a reliability in connection between the grounding stay 80 and the motor housing 14.

A condenser holder portion 90 adjacent to the circuit breaker 64 and a condenser holder portion 91 arranged between the choke coil receiving portion 73 and the through hole 47 are provided on the end surface 44 of the supporting plate 45 in the side of the gear housing 24. A main body portion 92a of a condenser 92 corresponding to a noise prevention element having the same structure as that of the condenser 60 mentioned above is received in the condenser holder portion 90, and each of a pair of lead wires 92b and 92c protruding from the main body portion 92a protrudes to the side of the motor housing 14 of the supporting plate 45 via a through hole 93 provided in he supporting plate 45.

A taper portion 94 is provided in a side of the gear housing 24 in the through hole 93, that is, in an opening end portion in a side to which the lead wire 92b is inserted, as shown in FIG. 9. The taper portion 94 is formed as an irregular shaped taper in which one taper angle is larger than another taper angle with respect to an axis of the through hole 93, and is structured such as to easily insert the lead wire 92b to the through hole 93 at a time of attaching the condenser 92 to the condenser holder portion 90. Further, the branch plate 65 is provided with a connection hole 65a to which the lead wire 92b is inserted coaxially with the through hole 93, and this connection hole 65a is formed so that a diameter thereof is larger than that of the through hole 93. Accordingly, at a time of inserting the lead wire 92b to the through hole 23 from the side of the gear housing 24, a leading end portion of the lead wire 92b does not catch on the opening end of the connection hole 65a, so that it is possible to make an inserting work of the lead wire 92b, that is, an attachment of the condenser 92 easy. In this case, this structure is also applied to a through hole (not shown) in another lead wire 92c, and a through hole to which lead wires 95b and 95c of a condenser 95 mentioned below are inserted.

Further, one lead wire 92b of the condenser 92 is electrically connected to the branch plate 65 corresponding to the conductive member in accordance with a soldering, and another lead wire 92c is electrically connected to the connection plate portion 83b of the condenser side connection portion 83 in accordance with a soldering. That is, the condenser side connection portion 83 is electrically connected to the branch plate 65 via the condenser 92, and the branch plate 65 is electrically connected to the motor housing 14 via the condenser 92, the grounding stay 80 and the conductive plate 27.

A main body portion 95a of the condenser 95 corresponding to a noise prevention element having the same structure as that of the condensers 60 and 92 mentioned above is received in the condenser portion 91, and each of a pair of lead wires 95b and 95c protruding from the main body portion 95a protrudes to the side of the motor housing 14 of the supporting plate 45 via a through hole (not shown) provided in the supporting plate 45. Further, one lead wire 95b of the condenser 95 is electrically connected to the branch side connection portion 75b of the connection stay 75 corresponding to the conductive member in accordance with a soldering, and another lead wire 95c is electrically connected to the condenser side connection portion 82 of the grounding stay 80 in accordance with a soldering. That is, the condenser side connection portion 82 is electrically connected to the connection stay 75 via the condenser 95, and the connection stay 75 is electrically connected to the motor housing 14 via the condenser 95, the grounding stay 80 and the conductive plate 27.

Accordingly, in this sunroof motor 11, the condenser side connection portion 82 is provided so as to freely bend in a direction of moving apart from the end portion 42. Then, even in the case of assembling the grounding stay 80 to the gear housing 24 in the motor housing side connection portion 84 after soldering the condenser 95 to the condenser side connection portion 82, the force applied at that time is absorbed by the condenser side connection portion 82 moving apart from the end portion 42, so that it is possible to improve a reliability of the soldering portion in which the condenser side connection portion 82 and the condenser 95 are connected. Further, since it is possible to fix the motor housing side connection portion 84 to the gear housing 24 after soldering the condensers 92 and 95 to the grounding stay 80, it is possible to make an assembling work of the sunroof motor 11 easy.

Further, since the extension portion 83a is bent at 90 degrees with respect to the supporting plate 45 so as to be arranged along the inner surface of the outer peripheral wall 46a of the case 46, the extension portion 83a is hard to receive the noise discharged from the slidable contact portion between the commutator 23 and the brush portions 50b and 51b, and it is possible to reduce the noise generated in the sunroof motor 11. Further, it is possible to reduce the space for placing extension portion 83a. Further, since it is possible to secure a working space required at a time of bonding the connection plate 70 to the leg portion 66d of the choke coil 66 in accordance with a soldering, it is possible to make the assembling work of the sunroof motor 11 easy.

Further, since the motor housing side connection portion 84 is provided so as to freely bend with respect to the stay main body portion 81, the fixing force generated at a time of fixing the motor housing side connection portion 84 to the gear housing 24 is absorbed by the bending deformation of the motor housing side connection portion 84. Accordingly, the stress generated in the connection portion, that is, the soldered portion between the condenser side connection portions 82 and 83 and the condensers 92 and 95, at a time of fixing the motor housing side connection portion 84 to the gear housing 24, is reduced, and it is possible to secure a reliability in the connection portion between the condenser side connection portions 82 and 83 and the condensers 92 and 95.

In accordance with the structure mentioned above, the power supply circuit 61 shown in FIG. 10 is formed in the brush holder 40.

Next, a description will be given of an operation of the sunroof apparatus 3 having the sunroof motor 11 of the structure mentioned above.

First, when a sunroof opening and closing switch (not shown) is turned on in an opening side in the case that the roof panel 8 is in a fully closed state, a direct current is supplied to each of the power feeding terminals 54 and 55 from the battery via the female connector. At this time, the power feeding terminal 54 is set to a plus side, the power feeding terminal 55 is set to a minus side, and the direct current flows through the power supply circuit 61 from the power feeding terminal 54 toward the power feeding terminal 54 is supplied to the commutator 23 via the connection plate 62, the circuit breaker 64, the branch plate 65, the choke coil 66, the connection plate 70 and the leaf spring brush 51, and is rectified in the commutator 23 so as to be supplied to each of the armature coils 22. At this time, in the case that the current supplied from the power feeding terminal 54 becomes larger than a predetermined value for any reason, the circuit breaker 64 is driven and the power supply circuit 61 is shut off. The current supplied to the armature coils 22 is transmitted to another leaf spring brush 50 via the commutator 23. Then, the current reaching the leaf spring brush 50 is transmitted to the power feeding terminal 55 via the connection plate 71, the choke coil 72 and the connection stay 75, and grounded via the female connector. Accordingly, when the sunroof switch is turned on in the open side, the current flows through the armature coils 22 positioned within magnetic field formed by the permanent magnets 15 and 16, the rotation force is generated in the armature 17, and the armature shaft 18 rotates. Further, the rotation of the armature shaft 18 drives the rotation of the driving gear 10 via the worm gear mechanism 32, and the roof panel 8 is opened.

Next, when the sunroof switch (not shown) is turned on in a closing side in the case that the roof panel 8 is in a fully opened state, a direct current in an opposite direction to the direction in the case of turning on in the opening side flows through the power supply circuit 61. That is, the power feeding terminal 55 is set to a plus side, the power feeding terminal 54 is set to a minus side, and the direct current flows through the power supply circuit 61 from the power feeding terminal 55 toward the power feeding terminal 54. Accordingly, the current supplied to the power feeding terminal 55 is supplied to the commutator 23 via the connection stay 75, the choke coil 72, the connection plate 71 and the leaf spring brush 50, and the current in the opposite direction to that of the case that the opening side is turned on is rectified in the commutator 23 so as to be supplied to each of the armature coils 22. Further, the current transmitted to another leaf spring brush 51 via the commutator 23 is transmitted to the power feeding terminal 54 via the connection plate 70, the choke coil 66, the branch plate 65, the circuit breaker 64 and the connection plate 62, and is grounded via the female connector. Accordingly, when the sunroof switch is turned on in the dosing side, the current in the opposite direction to the direction in the case that the opening side is turned on flows through the armature coils 22 positioned within the magnetic field formed by the permanent magnets 15 and 16, and the armature shaft 18 rotates in the opposite direction to the direction in the case that the opening side is turned on. Further, the rotation of the armature shaft 18 drives the rotation of the driving gear 10 via the worm gear mechanism 32, and the roof panel 8 is closed.

In the sunroof motor 11 mentioned above, there is a case that a surge voltage, that is, a noise is generated in the power supply circuit 61 at a time of rectifying by the respective leaf spring brushes 50 and 51 and the commutator 23 on the basis of an influence of Inductance of the armature coil 22. Accordingly, in this sunroof motor 11, the structure is made such that the noise is reduced by each of the condensers 60, 92 and 95 and the choke coils 66 and 72. That is, the structure is made such that a noise having a relatively high frequency in the noise generated in the power supply circuit 61 is absorbed by the choke coils 66 and 72, and a noise having a relatively low frequency is absorbed by the condensers 60, 92 and 95. Further, when the power feeding terminal 54 is set to the plus side, the noise is absorbed by the condenser 92 provided between the branch plate 65 and the grounding stay 80, and when the power feeding terminal 55 is set to the plus side, the noise is absorbed by the condenser 95 provided between the connection stay 75 and the grounding stay 80.

Further, in the sunroof motor 11 mentioned above, a noise is generated by a spark generated in the slidable contact portion between the brush portions 50b and 51b and the commutator 23. In this case, the noise is discharged to the atmospheric air from the slidable contact portion between the brush portions 50b and 51b and the commutator 23, and is transmitted to the grounding stay 80 positioned near it. However, in this sunroof motor 11, since the grounding stay 80 is electrically connected to the motor housing 14 in the motor housing side connection portion 84, the noise generated in the grounding stay 80 is absorbed and reduced by the motor housing 14. Further, the noise generated in the power supply circuit 61 is also absorbed by the motor housing 14 via the grounding stay 80.

Accordingly, in this sunroof motor 11, since the power supply circuit 61 is electrically connected to the motor housing via the grounding stay 80, it is possible to absorb and reduce the noise generated in the power supply circuit 61 of the sunroof motor 11 by the motor housing 14. Further, it is possible to absorb the noise discharged to the atmospheric air from the slidable contact portion between the brush portions 50b and 51b and the commutator 23 and transmitted to the grounding stay 80 by the motor housing 14 so as to reduce the noise.

It goes without saying that the present invention is not limited to the embodiment mentioned above, and can be variously modified within the scope of the present invention. For example, in the embodiment mentioned above, the present invention is applied to the sunroof motor 11 driving the roof panel 8 provided in the vehicle 1 so as to be freely opened and closed, however, the application is not limited to this, and the present invention may be applied to an electric motor used for the other intended purposes. In this case, the electric motor may be structured such that no reduction gear 13 is provided.

Further, in the embodiment mentioned above, the condenser 60 is arranged between the power feeding terminals 54 and 55 and the armature shaft 18, however, the structure is not limited to this, and there may be arranged the other noise absorbing elements, the other electric parts and elements constituting the power supply circuit 61, and the like.

Further, in the embodiment mentioned above, the noise prevention element arranged in the axial direction of the screw member 53 in an overlapping manner is constituted by the choke coil 66, however, the structure is not limited to this, for example, the other noise preventing elements such as the condenser or the like may be arranged.

What is claimed is:

1. An electric motor having an armature which is provided with a commutator fixed to a rotation axis and an armature coil electrically connected to said commutator and is rotatably provided within a motor housing, and having a brush which is held by a brush holder fixed to said motor housing and is in slidable contact with said commutator, comprising:

a power feeding terminal provided in said brush holder and electrically connected to a power source;

a conductive member provided in said brush holder and constructing a power supply circuit provided between said power feeding terminal and said brush;

a grounding member having a conductive member side connecting portion electrically connected to said conductive member and a motor housing side connecting portion electrically connected to said motor housing, said grounding member electrically connecting said conductive member to said motor housing;

a pair of said brushes are provided in said brush holder;

a first power feeding terminal and a second power feeding terminal are provided in said brush holder so as to be arranged side by side in a width direction thereof, wherein said first power feeding terminal is provided with a first connecting portion electrically connected to one of said brushes and with a first leading end portion electrically connected to said power source and formed in a flat shape extending in an axial direction of said rotation axis; and said second power feeding terminal is provided with a second connecting portion electrically connected to another of said brushes and with a second leading end portion electrically connected to said power source and formed in a flat shape extending in the axial direction of said rotation axis.

2. An electric motor as claimed in claim 1, wherein said brush holder is formed in a shape having a pair of end portions each having a circular are outer peripheral surface and a pair of side surface portions in which outer peripheral surfaces respectively connecting said pair of end portions are flat and said first and second power feeding terminals are provided in said one end portion.

3. An electric motor as claimed in claim 1, wherein a noise absorbing element having a first lead wire electrically connected to a base end portion of said first power feeding terminal and a second lead wire electrically connected to a base end portion of said second power feeding terminal is provided between said first and second power feeding terminals and said rotation axis so as to make said first and second lead wires in parallel to said rotation axis.

4. An electric motor as claimed in claim 2, wherein a noise absorbing element having a first lead wire electrically connected to a base end portion of said first power feeding terminal and a second lead wire electrically connected to a base end portion of said second power feeding terminal is provided between said first and second power feeding terminals and said rotation axis so as to make said first and second lead wires in parallel to said rotation axis.

5. An electric motor as claimed in claim 3, wherein any one of said first and second lead wires and said base end portions of the first and second power feeding terminals are bent vertical to the axial direction of said rotation axis.

6. An electric motor as claimed in claim 3, wherein said brush holder is provided with a wall portion for inhibiting said noise absorbing element from moving to a side of said rotation axis.

7. An electric motor as claimed in claim 5, wherein said brush holder is provided with a wall portion for inhibiting said noise absorbing element from moving to a side of said rotation axis.

8. An electric motor having an armature which is provided with a commutator fixed to a rotation axis arid an armature coil electrically connected to said commutator and is rotatably provided within a motor housing, and having a brush which is held by a brush holder fixed to said motor housing and is in slidable contact with said commutator, comprising:

a power feeding terminal provided in said brush holder and electrically connected to a power source;

a conductive member provided in said brush holder and constructing a power supply circuit provided between said power feeding terminal and said brush; and a grounding member having a conductive member side connecting portion electrically connected to said conductive member and a motor housing side connecting portion electrically connected to said motor housing, said grounding member electrically connecting said conductive member to said motor housing; wherein said motor housing side connecting portion is fixed to a cover member closing an opening end of said motor housing by a fastening means together with said brush holder.

9. An electric motor as claimed in claim 8, wherein said conductive member side connecting portion is electrically connected to said conductive member via a noise absorbing element.

10. An electric motor as claimed in claim 8, wherein said motor housing side connecting portion is provided so as to be freely bent with respect to a main body portion arranged on said brush holder.

11. An electric motor as claimed in claim 10, wherein a conductive plate electrically connected to said motor housing is provided between said motor housing and said cover member, and a connection piece formed in said conductive plate is fixed to said cover member by said fastening means together with said motor housing side connecting portion.

12. An electric motor as claimed in claim 8, wherein said conductive member side connecting portion is provided on said brush holder so as to be freely deformed in a direction moving apart from said brush holder.

13. An electric motor having an armature which is provided with a commutator fixed to a rotation axis and an armature coil electrically connected to said commutator and is rotatably provided within a motor housing, and having a brush which is held by a brush holder fixed to said motor housing and is in slidable contact with said commutator, comprising:

a power feeding terminal provided in said brush holder and electrically connected to a power source;

a conductive member provided in said brush holder and constructing a power supply circuit provided between said power feeding terminal and said brush;

a grounding member having a conductive member side connecting portion electrically connected to said conductive member and a motor housing side connecting portion electrically connected to said motor housing, said grounding member electrically connecting said conductive member to said motor housing;

at least a pair of said brushes are each fixed to said brush holder by screw members arranged in parallel to said rotation axis; and a noise preventing element provided in said power supply circuit is arranged so as to be lapped over any one of said screw members in an axial direction of said rotation axis.

14. An electric motor as claimed in claim 13, wherein said brush holder is formed in a shape in which a pair of end portions each having a circular arc outer peripheral surface and an outer peripheral surface each connecting a pair of said end portions have a pair of flat side surface portions, and said noise preventing element is provided in any one of said end portions.

15. An electric motor as claimed in claim 14, wherein a pair of said brushes are provided so as to be opposed to each other in a direction which is shifted at a predetermined angle with respect to a longitudinal direction of said brush holder.

16. An electric motor as claimed in claim 14, wherein one lead wire of said noise preventing element is electrically connected to said power supply circuit in one side of said end portions, and another lead wire is electrically connected to said power supply circuit in another side of said end portions.

17. An electric motor as claimed in claim 16, wherein said another lead wire reaches said another end portion along a guide wall portion provided in said side surface portion.

18. An electric motor as claimed in claim 13, wherein a receiving portion for receiving said noise preventing element is provided in said brush holder.

19. An electric motor as claimed in claim 13, wherein said noise preventing element is a choke coil arranged in such a manner that an axial direction thereof is made parallel to said rotation axis.

* * * * *